United States Patent [19]
Ottaviano

[11] 4,427,474
[45] * Jan. 24, 1984

[54] METHOD AND APPARATUS FOR MAKING AN AIR CELL CUSHIONING PRODUCT

[75] Inventor: Gary W. Ottaviano, Bedford Heights, Ohio

[73] Assignee: Ranpak Corp., Willoughby, Ohio

[ * ] Notice: The portion of the term of this patent subsequent to Feb. 9, 1999 has been disclaimed.

[21] Appl. No.: 333,042

[22] Filed: Dec. 21, 1981

[51] Int. Cl.³ .................. B32B 31/00; B32B 3/28
[52] U.S. Cl. .................. 156/145; 156/210; 156/245; 156/285; 156/292; 156/308.4; 156/309.9; 156/322; 156/324; 156/471; 156/499; 156/553; 428/166; 428/172; 428/178
[58] Field of Search .......... 156/77, 145, 209, 210, 156/285, 292, 308.4, 309.9, 322, 324, 443, 499, 156/553, 245, 470, 471; 428/166, 172, 178

[56] References Cited
U.S. PATENT DOCUMENTS 3,416,984 12/1968 Chavannes et al. ............ 156/209
4,314,865 2/1982 Ottaviano ................. 156/210 X Primary Examiner—Robert A. Dawson
Attorney, Agent, or Firm—Baldwin, Egan, Walling & Fetzer

[57] ABSTRACT

A method and apparatus for the production of air cell cushioning material, for protective cushioning purposes in packaging or other purposes, with the air cell product being formed from flexible, single stratum sheet of low density, low melting point thermoplastic, such as low density polyethylene film. The method and apparatus include an arrangement for cooling an embossed film on a rotatable forming drum to a predetermined temperature range prior to applying a sealing laminating film to the cooled embossed film, and are such that the apparatus can be halted in its operation without injurious effects to any substantial amount of the air cell product being produced, and can be restarted to again commence production of the air cell product. The apparatus and method utilize clear thermoplastic single stratum film, and result in an effective air cell cushioning product which possesses extremely good clarity even after the heating and pressure steps utilized in the production of the product.

19 Claims, 5 Drawing Figures

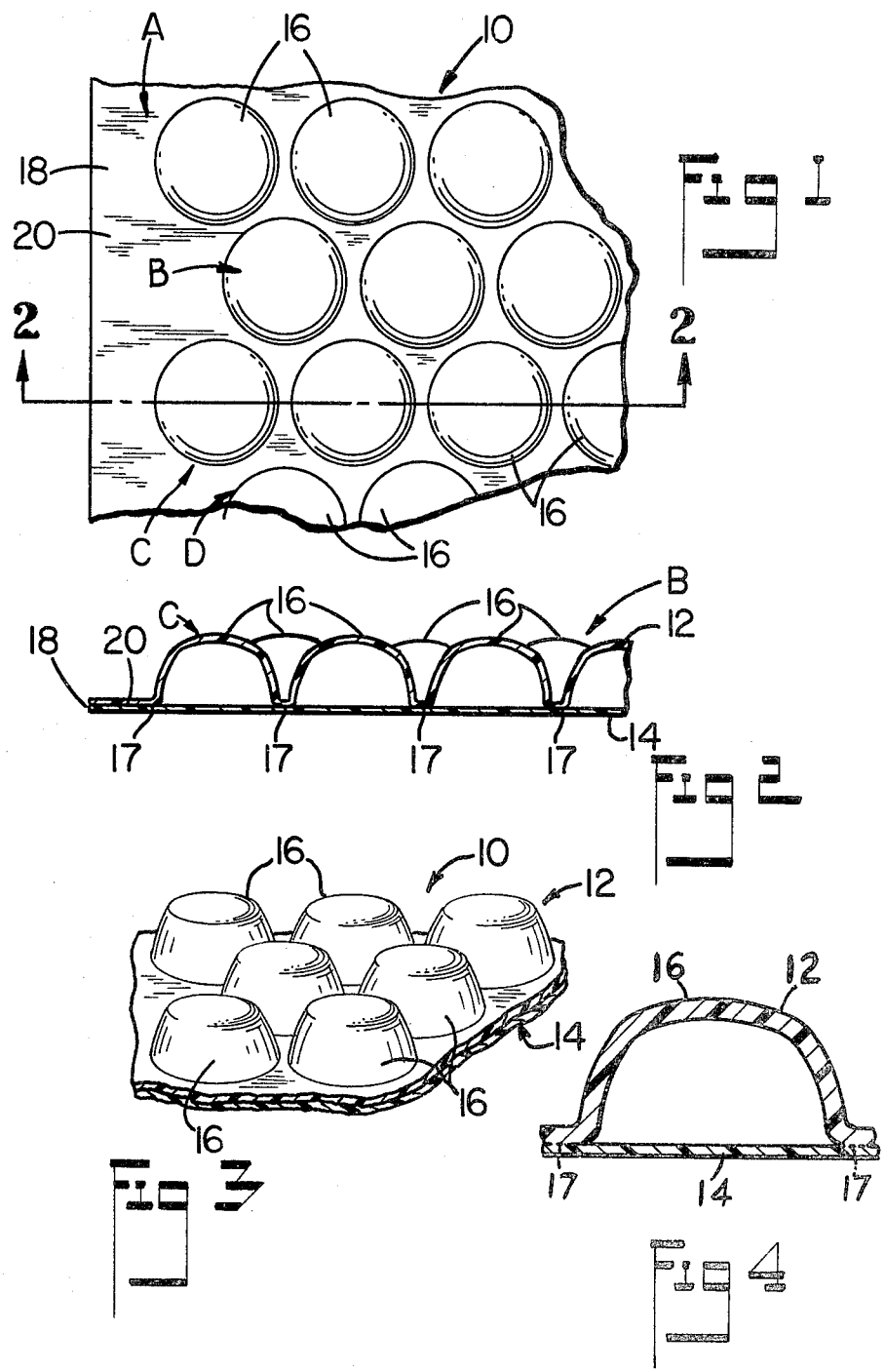

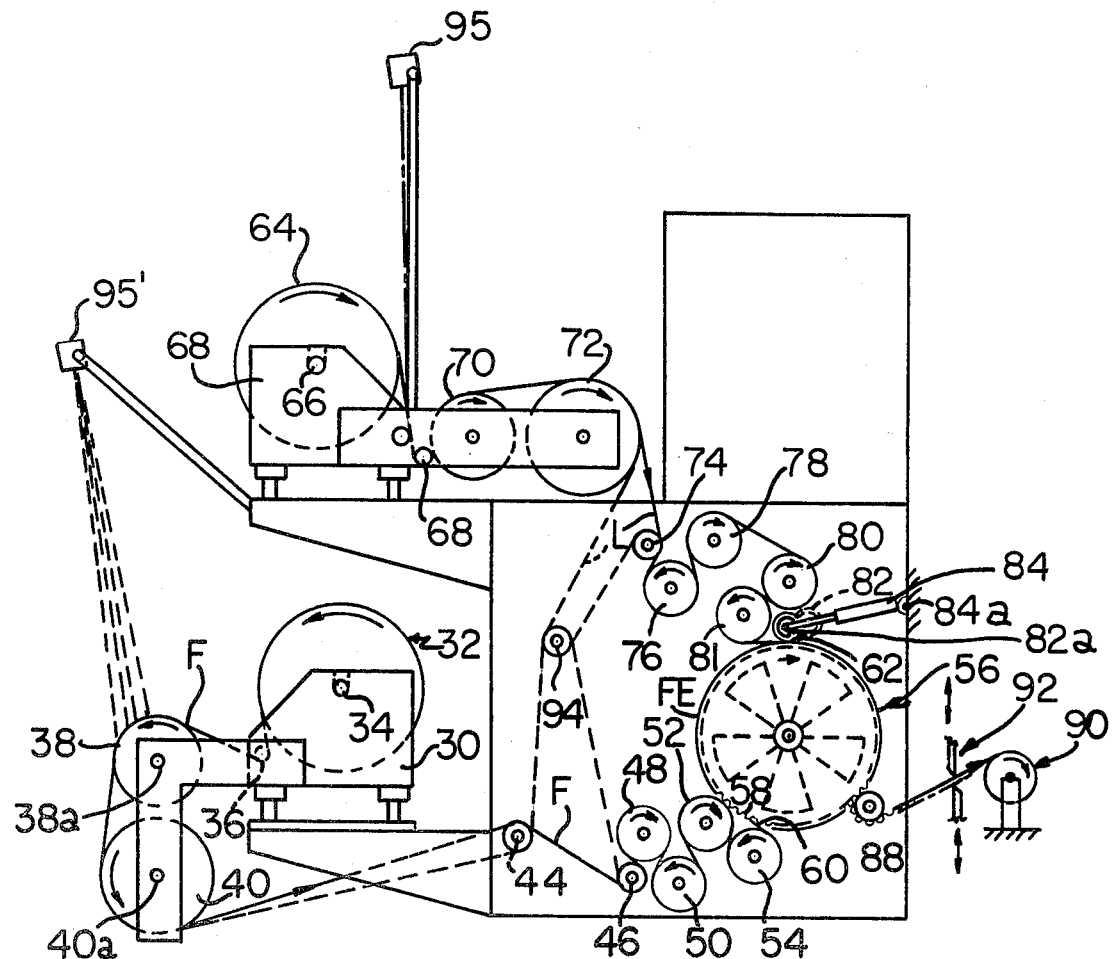
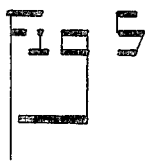

METHOD AND APPARATUS FOR MAKING AN AIR CELL CUSHIONING PRODUCT

This invention relates to an improved method and apparatus for the production of air cell sheeting material formed of flexible sheet or film of low density, low melting point thermoplastic, such as low density polyethylene, and more particularly relates to a relatively compact apparatus and a method which enables the operation of the apparatus to be expeditiously performed, and including the ability to interrupt the operation, without materially effecting the workability of the apparatus and/or method when the latter are reinitiated after termination of the interruption, and which results in a flexible air cell cushioning product of extremely good clarity.

BACKGROUND OF THE INVENTION

It is well known in the prior art to produce an air cell cushioning dunnage product utilizing flexible thermoplastic sheet or film material and embossing one of the sheets, and applying a laminating or cover sheet or film thereto, for sealing formation of the air cells, with the product being utilized in cushioning applications. U.S. Pat. No. 3,416,984 dated Dec. 17, 1968 and entitled Method and Apparatus For Making Cellular Material From Thermoplastic Sheets is an example of such prior art.

In such patent, a heat sealable plastic sheet is heated to bring its outer surface to a temperature in the vicinity of the fusion temperature thereof, and is embossed on a vacuum drum, with the other surface of the embossed sheet being maintained at about the fusion temperature of the plastic, and then the laminating sheet is applied to the embossed sheet while the latter is on the embossing drum, with the surface of the laminating sheet which is to contact the embossed sheet being at a temperature above the fusion temperature thereof, so as that when the laminating sheet is applied to the embossed sheet, the contacting surfaces will equalize at a temperature at least equal to the fusion temperature thus adhering or sealing the films together.

U.S. Pat. No. 3,392,081 discloses an air cell cushioning product formed of multi-laminate film and wherein the areas of engagement between the embossed film and the laminating film are adapted to be in a fusable state when applied together, to form the closed air cells.

Moreover, there are considerable other patents in the air cell cushioning field, such as for instance Australian Pat. No. 160,551 published Oct. 29, 1953, and U.S. Pat. Nos. 3,018,015; 3,142,599; 3,231,454; 3,285,793; 3,349,990; 3,577,305; 3,389,534; 3,523,055; 3,575,781; 3,616,155; 3,785,899; 3,817,803; 3,837,990; 3,837,991; 3,868,056; 4,076,872; and 4,096,306.

In Applicant's copending U.S. patent application Ser. No. 75,662, now U.S. Pat. No. 4,314,865, filed Sept. 14, 1979 and entitled "Cushioning Dunnage Product, Apparatus and Method" there is disclosed a method and an apparatus for producing air cell cushioning dunnage which is formed from multi-stratum film of high density, high melting point, low density low melting point layers, and which include, a cooling step for cooling the product on the rotating forming drum to a particular temperature, prior to application of the laminating sheet to the embossed sheet on the drum.

The prior art methods and apparatus (other than Applicant's own as disclosed in aforementioned Pat. No. 4,314,865) are not generally of the type and size which can be readily and conveniently interrupted in operation and then restarted, without having considerable undesirable effects upon the resultant product, on the stock material utilized to produce the product, and/or the mechanism or apparatus per se; and such prior art does not teach an arrangement for cooling a heated embossed single stratum film on a rotatable forming drum and by means of such drum, to a predetermined temperature range prior to applying a heated laminating single stratum film thereto with associated pressure, for heat bonding the films together for sealing the air cells.

SUMMARY OF THE INVENTION

The present invention provides a novel method and an apparatus for the production of air cell flexible thermoplastic sheeting material, and an apparatus and method which provides for expeditious production of the cushioning product and includes the step of cooling a heated single stratum embossed sheet on a rotating forming drum to a predetermined temperature range prior to applying a heated single stratum laminating film to the cooled embossed film, and wherein the apparatus can be conveniently interrupted in its operation without material harmful effects on the plastic sheet or film stock material utilized for the apparatus and for the method in the production of the product.

Accordingly, an object of the invention is to provide a novel method for the production of air cell flexible thermoplastic sheeting material, for use, for instance, in protective packaging applications, as well as in other applications.

A still further object of the invention is to provide a novel apparatus for the production of flexible thermoplastic air cell material, and one wherein the apparatus is relatively compact and can be selectively interrupted in its production process without harmful effects on the stock material utilized to produce the product, or on the apparatus, or on the resultant product.

A still further object of the invention is to provide a novel method for the production of flexible air cell product from low density low melting point thermoplastic film which includes the steps of cooling a heated vacuum formed embossed sheet of the single stratum thermoplastic film on a rotating vacuum forming drum to a temperature approaching the heat softening temperature of the film, and within a temperature range which is no greater than about 30 degrees above the heat softening temperature of the film, prior to applying a heated single stratum laminating film to the embossed film, with associated pressure, to heat bond the thermoplastic films together at the areas of engagement therebetween.

Other objects and advantages of the invention will be apparent from the following description taken in conjunction with the accompanying drawings wherein:

BRIEF DESCRIPTION OF THE DRAWINGS

FIG. 1 is a top plan fragmentary view of a section of the cushioning dunnage material as produced by the method and apparatus.

FIG. 2 is a sectional view taken generally along the plane of line 2—2 of FIG. 1, looking in the direction of the arrows.

FIG. 3 is a fragmentary, perspective view of the cushioning dunnage material.

FIG. 4 is an enlarged, vertical, sectional view of one of the air cells of the produced product, illustrating the single stratum low density thermoplastic film utilized to produce the product.

FIG. 5 is a side elevational, generally diagrammatic view of an apparatus utilizable in producing the thermoplastic air cell product and in performing the method of producing the product.

DESCRIPTION OF PREFERRED EMBODIMENTS

Referring now again to FIG. 1, there is illustrated a plan view of an air cell cushioning product 10 provided in accordance with the invention. The product is formed of two sheets 12 and 14 of flexible thermoplastic material, with one of the sheets (i.e. 12) having been embossed to define relatively closely spaced cells 16 which are adapted to contain air which is entrapped by the laminating or cover sheet 14. Sheets 12 and 14 are heat sealed to one another at spaced areas 17 (FIG. 2). As can be best seen in FIG. 1, the cells 16 are preferably arranged in rows (e.g. A,B,C,D) which are preferably straggered with respect to one another and with respect to the side edge 18 of the strip of air cell cushioning material, with there being preferably provided along each side edge of the formed strip of air cell material a substantial width area 20 prior to commencement of the rows of air cells 16. The width of area 20 commencing at edge 18 and extending to the confronting periphery of the closest air cell, may be in the range of from about 0.125 to about 1 inch, but preferably is in the range of from about 0.35 to 0.5 inch for a two foot wide strip of cushioning material.

Each of the air cells 16 is of general dome shaped configuration, as shown, and is, in the embodiment illustrated, filled with air, which provides a cushioning effect when the product 10 is utilized for instance in packaging around a product, so as to cushion the product from vibration and/or shock damage. Referring now to FIG. 2, each of the air cells 16 illustrated is preferably within a range of approximately 1/16 to ½ inch high by approximately 1-3/16 inches in diameter, with air filling the respective air cell and maintaining the walls of the air cell in the generally dome configuration illustrated. Various heights and diameters of cells may of course, be provided.

Each of the sheets 12 and 14 used in the formation of the product may be and preferably is formed of a single stratum of flexible low density, low melting point polyethylene film. Such film is commercially available and may be of a thickness within the range of approximately 0.5 mil to 8 mil, as will be hereinafter described in greater detail. Such polyethylene film has a heat softening point of about 160° F. and a melting point of about 230° F. The latter specified heat softening point or temperature is the temperature at which the polyethylene film commences to change from a crystalline structure to an amorphous structure.

FIG. 5 illustrates diagrammatically, an apparatus for producing the cushioning product of the invention. In the embodiment illustrated, the apparatus comprises a frame 30 on which may be rotatable mounted a supply roll 32 of the flexible low density, low melting point, thermoplastic sheet of film material F, for rotation about a generally horizontal axis 34. The stock sheet material F is pulled off roll 32 and passes about a preferably stationary, generally horizontally oriented shaft 36 which is preferably coated with a layer of some friction reducing anti-adhesion material, such as for instance polyetetrafluorethylene, otherwise known as "Teflon".

The sheet F passes beneath shaft 36 and then passes over a heating roller 38 which is preferably driven about axis 38a on frame 30, and which roller should be maintained rotatable and movable with the film F at a surface speed at least not to exceed the speed of travel of the film. Roller 38 is preferably coated with a heat resistant anti-adhesion coating and is preferably heated to a surface temperature of between approximately 120° to 180° F. by any suitable means, such as for instance, by thermostatic controlled electric heating means of known type, embodied therein. Passage of the plastic sheet around a portion of roller 38 causes it to be preheated to a temperature within the heat range of roller 38 of approximately 120° to 180° F.

The web of sheet material F then passes down around a portion of roller 40 (which is preferably an idler) which again is heated preferably to a surface temperature range of between approximately 120°-180° F. Roller 40 should be maintained rotatable and movable with the film F at a surface speed at least not to exceed the speed of travel of the film. If roller 40 is driven, it preferably is at a speed just slightly greater than the speed of roller 38. Roller 40 is, as illustrated, preferably of a larger diameter as compared to roll 38 and is rotatable about axis 40a on framework 30, in a generally similar manner as roll 38. Roller 40 is preferably surface coated with heat resistant anti-adhesion material in a similar manner as roller 38.

From roller 40, the web of plastic sheet moves about preferably non-heated idler roller 44 which again is preferably surface coated with a layer of anti-sticking heat resistant material, such as the aforementioned "Teflon". The sheet may be and preferably is traveling at a rate of approximately 52 feet per minute, and therefore the temperature of the sheet is generally maintained even though it passes over non-heated roller 44, such sheet being maintained relatively close to the aforementioned 120°-180° F. temperature.

From idler roller 44, the sheet passes about roller 46 which preferably is non-heated. Roller 46 preferably is an idler roller. The sheet then passes about closely spaced rollers 48, 50, 52, 54, all of which are heated, and all of which, together with roller 46, preferably have an exterior surface coating thereon of anti-adhesion material, such as the aforementioned "Teflon". Roller 48 is preferably at a surface temperature of between approximately 150°-190° F. Roller 50 is preferably at a surface temperature of between approximately 180°-210° F. Roller 52 is preferably at a surface temperature of between approximately 190°-225° F., while roller 54 is preferably at a surface temperature between approximately 215°-235° F., to provide for subsequent thermoforming of the film. All of the rollers 48, 50, 52, and 54 are power driven, are of approximately the same size, and are driven at the same speed, preferably from a common source.

From roller 54, the sheet material is immediately applied to an embossing drum 56, various types of which are known in the art. Embossment of the plastic film or sheet on the embossing drum 56 is preferably accomplished by vacuum means (e.g. producing a vacuum of 3-5 inches of mercury) communicating with each individual depression 58, located on the surface of the embossing drum. The depressions 58 are conventionally connected by passages connecting with a vacuum manifold in the embossing drum 56 and coupled to a controlled source of vacuum. The forming drum 56 may be conveniently made of aluminum, with the surface thereof being preferably coated with a layer of adhesion preventing material, such as the aforementioned "Teflon" so that the preheated plastic sheet will not adhere to the surface of the forming drum 56 during the embossing operation. Although the drawings show a generally dome shaped defining surface of the depressions 58, as well as the exterior surface of the finished product (as shown in FIG. 4), it will be understood that the size, configuration and distribution of the embossments may be modified as desired so as to provide for different purposes or requirements. However, the dome shaped configuration illustrated is preferred for the embossed air cells.

The drum is preferably maintained at a surface temperature within the range of approximately 170°–190° F. Any suitable means can be utilized to maintain the temperature of the drum 56, with internal water flow being suitable, or internal air flow likewise being suitable, the ultimate purpose being among other factors, the controlled cooling of the embossed film or sheet FE on the drum, as will be hereinafter described. Interior passages in the drum may provide for circulation of the water or air medium.

It will be seen from FIG. 5 that in the embodiment illustrated, the pre-heated plastic sheet or film F is preferably applied to the forming drum 56 near the latter's lowermost underside position, and is embossed as the drum rotates. At approximately 160 circumferential degrees on the drum (in the embodiment illustrated) from the initial point of application of the sheet F to the embossing drum 56, a heated laminating or cover sheet L is applied. Accordingly, since the embossing drum is at a temperature of between approximately 170°–190° F., and the embossed sheet FE is at a much higher temperature (i.e. within a range of 215° to 235° F.) substantial cooling of the embossed sheet FE on the drum occurs as the drum rotates from position point 60 where the sheet F is first applied thereto, to the position 62 where the heated laminating or cover sheet L is applied to the cooled embossed sheet. Accordingly, the exterior or outward facing surface of embossed sheet FE just immediately prior to point 62 is at a temperature within the range of approximately 170°–190° F., the drum having cooled the embossed plastic sheet down to a temperature well below the temperature at which the polyethylene film was thermoformed or embossed, and to a temperature approaching the heat softening point of the polyethylene (e.g. 160° F.) and to a temperature within at least thirty degrees of said softening point.

The supply of laminating sheet L is preferably mounted on a roll 64 rotatably mounted about an axis 66 on upper frame 68 of the apparatus. Sheet L is a single stratum flexible thermoplastic film, preferably polyethylene, and preferably is thinner than the thickness of embossing sheet F. In this connection, if the embossing sheet F is 2 mils in thickness, the laminating sheet L will be preferably 1.0 mil thickness. However, for purposes of air cell cushioning dunnage, the embossed film thickness is preferably within the range of approximately 1 to 8 mils, while the cover or laminating film L is preferably of a thickness within the range of approximately 0.5 to 4 mils.

From roll 64, the laminating sheet is pulled off to pass around non-heated, non-rotatable, rod 68 and then upwardly to pass onto heated preferably idler roller 70 which is preferably heated to a surface temperature within a range of approximately 120° to 180° F. similarly to aforediscussed rollers 38 and 40 which coact with the embossing sheet F. Roller 70 should be maintained rotatable and movable with film L, and at a surface speed at least not to exceed the speed of travel of the film L.

From roller 70, the laminating sheet passes around increased diameter roller 72 which is preferably heated to a similar surface temperature (i.e. 120°–180° F.) with roller 72 likewise being preferably an idler roller, but maintained rotatable and movable with the film, and at a speed at least not to exceed the speed of the film. The laminating sheet L then engages non-heated idler roller 74. Rollers 70, 72 and 74 as well as aforementioned rod 68, are preferably coated with a layer of anti-sticking material such as Teflon, in a similar arrangement and for the same purpose as in the other coated rollers.

From roller 74, the laminating sheet passes about heated roller 76, which preferably is at a surface temperature within a range of approximately 150°–190° F., thus raising the temperature of the laminating film as it passes about substantially a major extent of the circumference of roller 76. As can be seen, the laminating sheet preferably passes around about at least 240° of the total circumference of roller 76.

From roller 76 the laminating sheet L passes about roller 78 which is preferably at a surface temperature within the range of 180°–210° F.

From roller 78, the laminating sheet L passes about roller 80 which is preferably maintained at a surface temperature of approximately 215°–230° F., thus raising the laminating sheet temperature to about the melting temperature of the polyethylene film, and from roller 80 the sheet passes about a substantial portion of the exterior periphery of roller 81 which is preferably maintained at a surface temperature of approximately 230°–240° F. All of rollers 76 through 81 are power driven at the same speed and preferably have coverings of anti-sticking material thereon. Rollers 76 through 81 are driven at the same speed as aforementioned rollers 48 through 54, (may be geared to the same source of power) and which speed is slightly slower than the speed of rotatably driving the forming drum 56, and are of the same size as rollers 48 through 54. As an example, the peripheral speed of the heating rollers 48–54 and 76–81 may be approximately 52.17 lineal ft. per minute while that of the forming drum 56 may be 52.24 lineal ft. per minute.

From roller 81, the laminating sheet is directed toward the periphery of the embossing or forming drum 56 where the pressure engagement of the laminating sheet L with the exterior or confronting surface of the embossed sheet FE is accomplished at point or line 62 by means of generally linearly movable nip roller 82. Roller 82 is preferably at a surface temperature of approximately 250° F. and preferably includes a resilient layer of for instance silicone rubber, which in turn is "Teflon coated", and is movable to and from engagement with the exterior of the laminating sheet L as by means of the pair of spaced double acting air cylinders 84 disposed on each end of the rotary axis 82a of the roller 82, and coacting therewith so as to direct the nip roller 82 toward line engagement of the laminating sheet with the embossed sheet upon actuation of motor units 84.

Motor units 84 are preferably pivoted as at 84a to a support portion of the apparatus frame thus providing for relative pivotal movement of the motor units with respect to the supporting frame. Motor units 84 preferably provide a total combined force of approximately 268 pounds on the rotatable axle of roller 82, (approximately 11.0 pounds per lineal inch for a 2 foot long roller 82) although a lesser force, and as for instance, 220 pounds total force would result in an adequate bonding of the laminating sheet L to the embossed sheet FE; however approximately 268 pounds is preferred. Roller 82 is approximately the same length as drum 56. Since the laminating sheet L as it is applied to the embossed sheet is at a temperature of approximately 230° F., at or close to the melting temperature of the polyethylene film, a positive fusion or heat seal bond occurs between the laminating sheet and the embossed sheet, with the laminating sheet passing heat to the confronting surface of the embossed sheet, so as to cause some melting of the confronting surface on the embossed sheet, and together with the pressure and heat applied by roller 82, providing for a secure bond between the laminating and embossed film layers. It will be understood that the laminating sheet L and pressure roller 82 causes the confronting surface of the cooler embossed sheet to increase from a temperature within a range of 30 degrees of the embossed sheet's softening point temperature (due to the cooling action of the drum) to its melting temperature, thus bonding together the surface of the embossed sheet FE and the adjacent engaged melted surface of the laminating sheet, with substantially only surface melting occurring due to the heat transfer from the hot laminating sheet L.

In this connection, the maintenance of pressure roller 82 at about 250° F., which is above the melting temperature of the laminating film, and which is above the maximum surface temperature of heating roller 81, ensures that the heat in the heated laminating film will be urged or directed in the direction of the engagement boundry between the laminating film and the embossed film as they are pressed together, (and not in a direction away from such boundry) thus insuring a good heat bond therebetween.

The sealed cushioning dunnage product is then moved about the surface of the embossing drum from the point of engagement of the laminating sheet with the embossed sheet, to the anti-stick coated, driven roller 88 which preferable is at a temperature below 100° F., or at least no greater than 100° F., and thus the cushioning dunnage product, further cooled by the drum, is stripped off the forming drum 56 and directed to another location such as for instance to rotatable accumulator 90, where it can be disposed in rolled or other form for convenient handling and/or storage thereof. By maintaining the "strip-off" roller 88 at the indicated temperature, wrinkles in the finished product are aided in being prevented. Roller 88 and accumulator 90 are driven at the same surface speed as drum 56. A cutter unit 92 of any suitable type may be provided for severing an accumulated roll of air cell product from the producing apparatus. The produced product illustrated in FIGS. 1–4 has a "clear" or "see through" appearance, which enhances its desirability and saleability. This "clear" or "see through" characteristic is believed to at least in part, be due to the cooling of the embossed film on the drum to a temperature approaching its heat softening point and within a predetermined temperature range of such heat softening point, just prior to application of the heated laminating sheet thereto.

Referring now specifically again to FIG. 5, there is shown an alternate path in dashed lines, for movement of the laminating sheet, by the provision of an additional idler roller 94 which is rotatable about a horizontal axis, and which is preferably coated with a layer of anti-adhering material, such as the aforementioned "Teflon". The laminating sheet can pass about roller 94 prior to passing about roller 74, thus providing for an additional drying time of a coating applied to the laminating sheet L as by means of a spray head 95 adjustably supported on frame 68. Such coating could be, for instance, an anti-static coating sprayable in liquid form onto sheet L as it passes from stock roll 64 around shaft 68 and roller 70.

This anti-static material is commercially available item and can be purchased under the tradename of Staticide General Purpose, obtainable from Analetical Chemical Laboratories of Elk Groove Village, Illinois 60007. This material provides for rapid dissipation of any electrical static charges which may occur and which may be detrimental in the use of the product.

Spray head 95', may likewise apply a coating, such as the aforementioned anti-static material, to the embossing sheet F, with the latter passing about an idler roller, such as roller 94, to provide drying time, prior to passing to the heating rollers 46 thus 54 and as illustrated in dashed lines in FIG. 5.

In any event, it will be seen that both single stratum sheets, sheet F to be embossed, and the laminating or cover sheet L, are generally simultaneously passed about groups of heating rollers which have generally increasing temperature, to progressively increase the temperature of the sheet material, with the laminating sheet L being applied under pressure to the confronting surface of the embossed sheet at about the melting temperature of the laminating sheet while at the time that the embossed sheet has been cooled by the forming drum to a temperature well below the melting temperature of the embossed sheet and is at a temperature within a predetermined range of the softening temperature of the latter sheet. This enables good control of the embossed sheet, and the maintenance of the film clarity of the transparent air cell product, but yet still provides for a positive sealing of the laminating sheet L to the embossed sheet FE, thus maintaining the integrity of the air cells, and the quality cushioning characteristics of the product.

In the aforedescribed temperature range (i.e. 170°–190° F.) of the forming or embossing drum, the lower temperature identified in the range (i.e. 170° F.) is adapted for use when film F to be embossed is relatively thick, as for example within a thickness range of 4 to 8 mils; the higher temperature identified within the temperature range of the drum (i.e. 190° F.) is adapted for use when the thickness of the film F is relatively thin, as for example 1 mil to 3 mil in thickness. Accordingly, it will be seen that the thicker the embossed film is, the greater the amount of heat adapted to be removed from the film by the cooling action of the forming drum, in this apparatus and method, assuming a substantially constant rotational speed of the drum. In any event, whether the embossed film is 1 mil or 8 mils or somewhere therebetween in thickness, the embossed film is adapted to be cooled by the forming drum to a temperature approaching the heat softening point of the embossed film and in a range which is no greater than 30 degrees above the heat softening point of the embossed film, prior to application of the heated laminating film to the cooled embossed film.

The reverse of the above holds true for the temperature ranges given for the heating roller series for the embossed film and the laminating film (i.e. the thinner the film, the lower temperatures of the range preferably applies; the thicker the film, the higher of the temperature range preferably applies), but always generally within the ranges specified.

While polyethylene has been identified as the preferred film for use in the method and apparatus of the invention, other single stratum thermoplastics such as for instance polyvinylchloride or polypropylene, could be utilized within the film thickness ranges identified. However, polyethylene film is preferred.

From the foregoing description and accompanying drawings it will be seen that the invention provides a novel method and apparatus for the production of transparent air cell material, such as for instance air cell cushioning dunnage material, with the product comprising a single stratum embossed layer of flexible thermoplastic sheet or film and a single stratum cover or laminating layer of flexible thermoplastic film secured together by heat-pressure bonding, and defining a plurality of spaced closed air cells therebetween. The laminating sheet in the method of the invention is heated to a temperature at about the melting temperature of the sheet and is applied to the embossed sheet which at the moment of application of the laminating sheet thereto has been cooled by the embossing drum to a temperature well below the embossing or thermoforming temperature of the thermoplastic sheet and to a temperature within a predetermined temperature range of the softening point temperature of the embossed sheet, with the laminating sheet being sufficiently hot so that the heat thereof when applied to the embossed sheet will cause melting of the confronting surface of the embossed sheet, and with applied pressure and heat, provides an expeditious heat sealed bond between the sheets. The method and apparatus are such that the machine can be halted in its operation without producing injurious effects or problems to the machine and/or the air cell product being formed, and can be restarted to again commence production of the air cell product.

The terms and expressions which have been used are used as terms of description, and not of limitation, and there is no intention, in the use of such terms and expressions, of excluding any equivalents of the features shown and described or portions thereof, but it is recognized that various modifications are possible within the scope of the invention claimed.

What is claimed is:

1. In a method of manufacturing air cell cushioning dunnage material from a plurality of sheets of flexible thermoplastic, single stratum film, of low melting point, low density material, such as for instance polyethylene film, comprising the steps of, heating a first of the sheets to a temperature sufficient for providing for vacuum forming of the sheet on a forming drum, and embossing said heated first sheet by feeding it onto the rotating forming drum having a plurality of recesses therein and forming the air cells in the recesses on said forming drum by vacuum, heating a second sheet of the thermoplastic film to about the melting point of the second sheet, cooling the embossed sheet while on said rotating drum by means of said drum to a temperature below said vacuum forming temperature and to a temperature approaching the heat softening point of said thermoplastic material and within a temperature range which is no greater than 30 Fahrenheit degrees above the heat softening point of said material, and then applying said second sheet to said first sheet together with predetermined pressure, whereby the residue heat in said second sheet causes a melting of the confronting surface of the cooled embossed sheet sufficiently in conjunction with said applied pressure, to cause a heat bonding of said first and second sheets at the areas of engagement while on the drum so as to seal the air cells in the formed product, and then removing the formed product from the forming drum.

2. A method in accordance with claim 1 wherein said applied pressure is accomplished by means of a rotatable roller, and wherein said applied pressure is at least within the range of approximately 6 to 11 pounds per lineal inch of engagement between the roller and said drum, and including the step of heating said roller to a temperature at least as great as the temperature of said second sheet prior to the latter's application to said drum.

3. A method in accordance with claim 1 wherein said applied pressure is accomplished by means of a rotatable roller the axis of rotation of which extends generally parallel to the rotary axis of said drum, and wherein the applied pressure is at least within the range of approximately 6–11 pounds per lineal inch of engagement between the roller and said drum.

4. A method in accordance with claim 1 wherein said applied pressure is accomplished by means of a rotatable roller the axis of rotation of which extends generally parallel to the rotary axis of the drum, and is within the range of approximately 6–11 pounds per lineal inch of engagement between the roller and said drum, and including the step of applying heat to the exterior surface of said second sheet to provide a temperature at the engagement of said roller with said second sheet which is at least as great as the temperature of said second sheet just prior to its being applied to said drum.

5. A method in accordance with claim 1 wherein said first sheet is heated to a temperature of about the melting point temperature thereof just prior to its being applied to the forming drum, and the second sheet is heated to a temperature of about the melting point temperature of said second sheet just prior to its being applied to the cooled embossed first sheet on the forming drum.

6. A method in accordance with claim 1 wherein said first sheet is cooled on said forming drum, by said forming drum, to a temperature in the range of 170°–190° F., just prior to said second sheet being applied to said first sheet.

7. A method in accordance with claim 1 including maintaining the forming drum at a surface temperature of approximately 170°–190° F., during application of said first and second sheets thereto, and the formation of said air cell product, and removal of the latter from the drum.

8. A method in accordance with claim 1 wherein said second sheet is heated to a temperature within the range of 230–240° F., just prior to its being applied to the cooled embossed first sheet on the forming drum.

9. A method in accordance with claim 1 wherein said first and said second sheets are progressively heated to said respective temperatures by a plurality of heated and rotatably powered roller means, and including the step of driving said forming drum at a peripheral speed slightly greater than the peripheral speed of said roller means.

10. A method in accordance with claim 1 including the step of applying anti-static material to at least one of said sheets, prior to its being applied to the other on the forming drum.

11. A method in accordance with claim 1 wherein the first sheet is initially passed about a roller maintained at a temperature of approximately 120°–180° F., and of a predetermined diameter, and then is passed about another roller maintained at a temperature in the range of approximately 120°–180° F., with the second mentioned roller being of a greater diameter as compared to that of the first roller, and then passing the first sheet about a further roller which is non-heated, and then passing the first sheet about a further roller which is non-heated and passing the first sheet about a further driven roller which is maintained at a temperature between approximately 150°–190° F., and then about a further driven roller which is maintained at a temperature of between approximately 180°–220° F., and then about a further driven roller which is maintained at a temperature of between approximately 190°–225° F., and about a further driven roller which is maintained at a temperature of between approximately 215°–235° F., and then is applied to the forming drum which is maintained at a temperature of between approximately 170°–190° F., and wherein embossment of said first sheet occurs at a vacuum of approximately 3–5 inches of mercury.

12. A method in accordance with claim 1 including applying heat in conjunction with said pressure, so as to cause the migration of heat in said second sheet in the direction of the juncture between said first and second sheets, and not away therefrom.

13. A method in accordance with claim 12 wherein said applied pressure is accomplished by means of a rotatable roller, the axis of rotation of which extends generally parallel to the rotary axis of said drum, and said applied heat is to said rotatable roller, whereby the latter has a surface temperature of approximately 10 to 20 Fahrenheit degrees higher than the temperature of said second sheet upon the latter's application to said first sheet.

14. A method in accordance with claim 1 wherein said first sheet has a thickness within the range of approximately 1 mil to approximately 8 mils, and said second sheet has a thickness within the range of approximately ½ mil to approximately 4 mils, the thickness of said first sheet being approximately twice the thickness of said second sheet.

15. In an apparatus for producing embossed air cell cushioning dunnage from flexible thermoplastic single stratum sheet stock, of low melting point, low density material, such as for instance polyethylene film, comprising a rotatable forming drum having a plurality of recesses formed in the surface thereof for vacuum forming the air cells in a first sheet of the thermoplastic material fed onto the rotating forming drum, a first series of spaced rollers, spaced, with respect to said forming drum and adapted for engagement with the first sheet, said series of rollers having means provided for heating the first sheet prior to its being fed onto said forming drum to a temperature adequate to provide for vacuum thermoforming of the air cells onto the first sheet on the forming drum, and a second series of rollers, spaced from said first series and having means adapted to heat a second of the thermoplastic sheets of stock materials to a temperature at about the melting point of the second sheet while engaging the second sheet, said forming drum including means for cooling the first sheet while on said forming drum during rotation of the latter, whereby the outwardly facing surface of the first sheet is cooled by said forming drum to a temperature below the vacuum thermoforming temperature of the first sheet and to a temperature approaching the heat softening point of the thermoplastic sheet material, and within a temperature range which is no greater than 30 Fahrenheit degrees above the heat softening point of the first sheet, and means coacting with said second series of rollers for pressurized application onto said rotatable forming drum of the heated second sheet from said second roller series, with the first sheet, whereby the residue heat in the second sheet will cause a melting of the confronting outwardly facing surface of the cooled embossed first sheet sufficiently in conjunction with said pressure, to cause heat bonding of the first and second sheets at the areas of engagement while on said forming drum during rotation thereof so as to seal the air cells in the formed product, the point of application of the second sheet to the cooled embossed first sheet on said forming drum by said application means being a substantial peripheral distance from the point of application of the first sheet to said rotating forming drum so that complete cooling of the first sheet including both side surfaces thereof, can occur on said forming drum prior to said application of the second sheet thereto, and a peripheral distance at least as great as the radius of said forming drum.

16. An apparatus in accordance with claim 15 including means for applying heat together with said application of pressure by said pressure means, and in an amount adequate to direct the heat from second sheet in a direction toward the juncture between said first and second sheets on said drum, at the point of application of said pressure means to said first and second sheets, whereby the heat in said second sheet is adequate to cause a sufficient melting of the confronting surface of the cooled embossed sheet in conjunction with said pressure to cause a heat bonding of said first and second sheets at the areas of engagement while on said drum, so as to seal the air cells in the formed cushioning product.

17. An apparatus in accordance with claim 15 including means for stripping the formed air cell product from the drum, said stripping means including means for maintaining the same at a maximum temperature of approximately 100° F.

18. An apparatus in accordance with claim 15 wherein said means for applying pressure at said application of said second sheet to said first sheet comprises a rotatable nip roller, the axis of rotation of which extends generally parallel to the rotary axis of said drum, with said nip roller being operable to apply a pressure within the range of at least 6–11 pounds per lineal inch of engagement between said nip roller and said drum.

19. An apparatus in accordance with claim 18 including means for applying heat at the line of application of pressure by said nip roller to said drum at a temperature at least as great as the temperature to which said second series of rollers is capable of heating said second sheet just prior to its application to said first cooled sheet.

* * * * *